United States Patent
Henderson

(10) Patent No.: US 11,415,337 B2
(45) Date of Patent: Aug. 16, 2022

(54) HINGED CONTROL BOX FOR AN RVAC

(71) Applicant: Haier US Appliance Solutions, Inc., Wilmington, DE (US)

(72) Inventor: Richard Dustin Henderson, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 445 days.

(21) Appl. No.: 16/571,354

(22) Filed: Sep. 16, 2019

(65) Prior Publication Data

US 2021/0080146 A1  Mar. 18, 2021

(51) Int. Cl.
*F24F 13/20* (2006.01)
*B60H 1/00* (2006.01)

(52) U.S. Cl.
CPC .......... *F24F 13/20* (2013.01); *B60H 1/00357* (2013.01); *F24F 2013/207* (2013.01); *F24F 2221/14* (2013.01)

(58) Field of Classification Search
CPC .. F24F 13/20; F24F 2013/207; F24F 2221/14; F24F 13/28; F24F 11/89; B60H 1/00357; B60H 1/00364; B60H 2001/00235
See application file for complete search history.

(56) References Cited

U.S. PATENT DOCUMENTS

| 3,727,537 | A  | * | 4/1973 | Harty, Jr. ........... B60H 1/00364 |
|   |   |   |   | 62/259.1 |
| 9,746,231 | B2 |   | 8/2017 | Moon et al. |
| 2014/0260393 | A1 | * | 9/2014 | Siddiqui ........... B60H 1/00364 |
|   |   |   |   | 62/410 |
| 2017/0045259 | A1 |   | 2/2017 | Choi et al. |
| 2019/0120520 | A1 | * | 4/2019 | Miyata ..................... F24F 11/88 |

FOREIGN PATENT DOCUMENTS

EP  3441693 A1  2/2019

* cited by examiner

*Primary Examiner* — Joseph F Trpisovsky
(74) *Attorney, Agent, or Firm* — Dority & Manning, P.A.

(57) ABSTRACT

A recreational vehicle air conditioner (RVAC) includes a ceiling-mount cover panel and a control box. The control box includes a first box portion and a second box portion. The first box portion is positioned above the ceiling-mount cover panel. The second box portion is connected to the first box portion with a hinge. The second box portion is pivotable between a closed configuration and an open configuration on the hinge. The second box portion is nested with the first box portion in the closed configuration, and the second box portion is pivoted away from the first box portion on the hinge in the open configuration. An electronic control panel is mounted to the second box portion of the control box.

19 Claims, 5 Drawing Sheets

HINGED CONTROL BOX FOR AN RVAC

FIELD OF THE INVENTION

The present subject matter relates generally to air conditioners in recreational vehicles.

BACKGROUND OF THE INVENTION

Certain recreational vehicles include an air conditioner (RVAC). An electronic control housing in known RVAC units is cumbersome to access. For example, the electronic control housing in known RVAC units can require a service technician on a ladder to remove and simultaneously handle multiple components.

BRIEF DESCRIPTION OF THE INVENTION

Aspects and advantages of the invention will be set forth in part in the following description, or may be apparent from the description, or may be learned through practice of the invention.

In an example embodiment, a recreational vehicle air conditioner includes a ceiling-mount cover panel and a control box. The control box includes a first box portion and a second box portion. The first box portion is positioned above the ceiling-mount cover panel. The second box portion is connected to the first box portion with a hinge. The second box portion is pivotable between a closed configuration and an open configuration on the hinge. The second box portion is nested with the first box portion in the closed configuration, and the second box portion is pivoted away from the first box portion on the hinge in the open configuration. An electronic control panel is mounted to the second box portion of the control box.

In another example embodiment, a recreational vehicle air conditioner includes a ceiling-mount cover panel that defines an opening. A control box includes a first box portion and a second box portion. The first box portion is positioned above the ceiling-mount cover panel, and the second box portion is connected to the first box portion with a hinge. The second box portion is pivotable between a closed configuration and an open configuration on the hinge. The second box portion is nested with the first box portion above the opening of the ceiling-mount cover panel in the closed configuration. The second box portion is pivoted away from the first box portion on the hinge in the open configuration such that the first box portion extends through the opening of the ceiling-mount cover panel. An electronic control panel is mounted to the first box portion or the second box portion of the control box.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
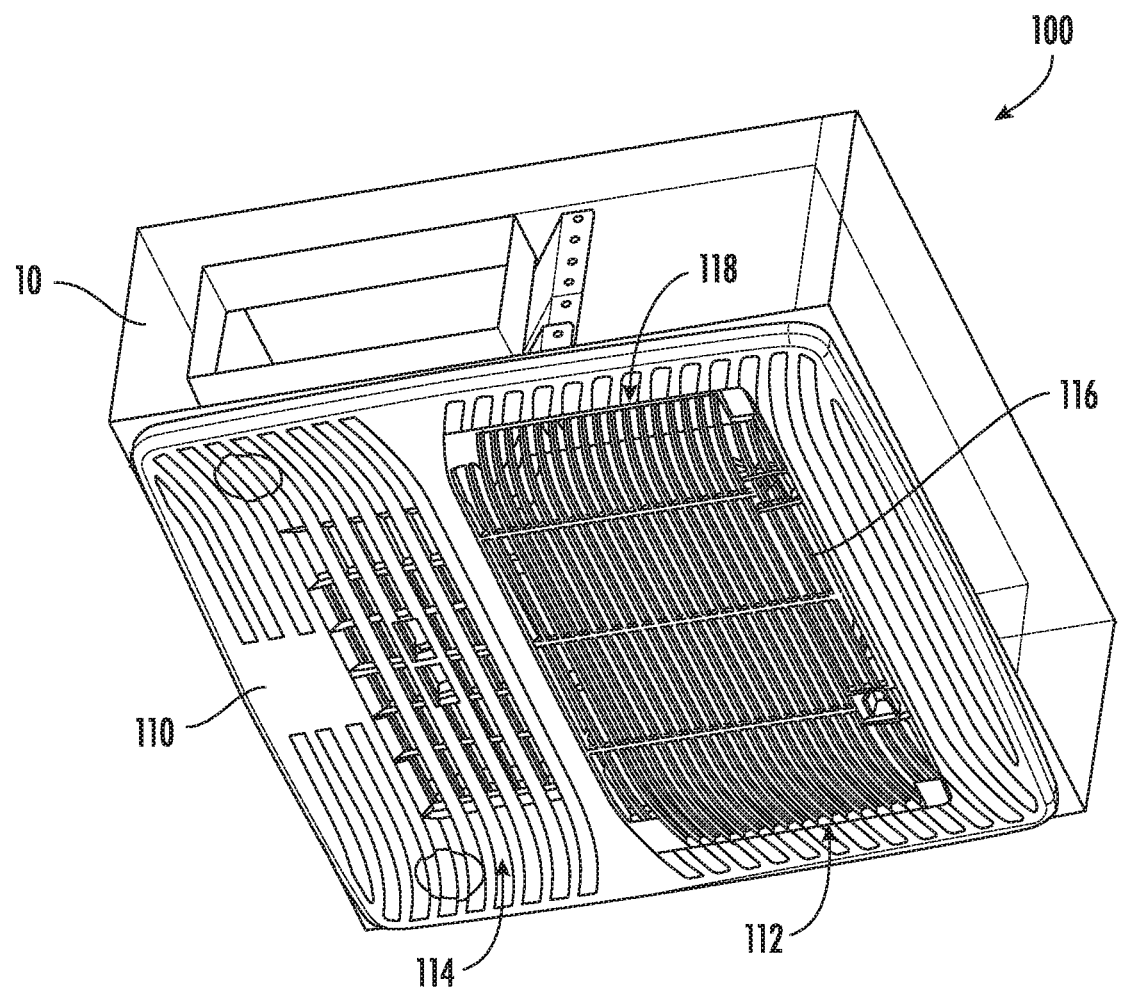
FIG. 1 is a bottom perspective view of a recreational vehicle air conditioner according to an example embodiment.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
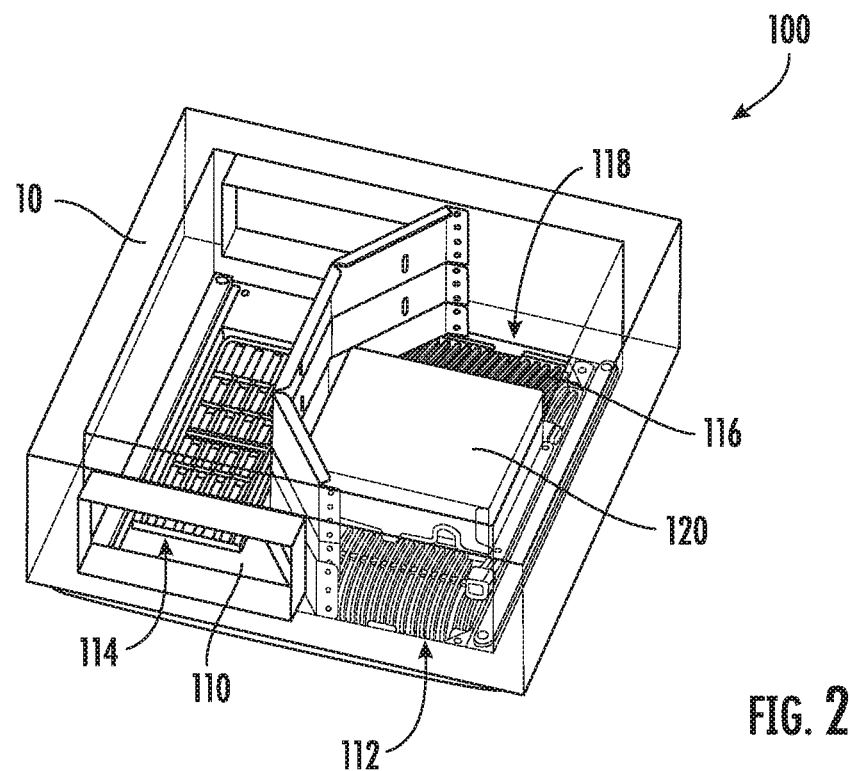
FIG. 2 is a top perspective view of the example recreational vehicle air conditioner of FIG. 1.

FIG. 1 is a bottom perspective view of a recreational vehicle air conditioner (RVAC) 100 according to an example embodiment. FIG. 2 is a top perspective view of RVAC 100. RVAC 100 may be used in or with any suitable recreational vehicle. Only relevant components of RVAC 100 are shown in FIGS. 1 through 7. It will be understood that RVAC 100 includes various heat pump components, such as a sealed system, for treating air within an interior of an associated recreational vehicle. Such components are well understood by those skilled in the art and are description of such components is omitted for the sake of brevity. As discussed in greater detail below, RVAC 100 includes features for facilitating access to electronic control components of RVAC 100.

As shown in FIGS. 1 and 2, RVAC 100 includes a ceiling-mount cover panel 110. Cover panel 110 may be mounted on a ceiling/duct 10 of an associated recreational vehicle within an interior of the associated recreational vehicle. Cover panel 110 may overlay and hide components of RVAC 100 to provide a pleasant cosmetic appearance for RVAC 100. Cover panel 110 may also include perforated sections to allow air to flow through cover panel 110. For example, cover panel 110 may include an air inlet 112 and an air outlet 114. Air inlet and outlets 112, 114 may be separate from each other on cover panel 110. Air from within the interior of the associated recreational vehicle may flow through cover panel 110 via air inlet 112, and such air may be treated (e.g., heated or cooled) by a sealed system of RVAC 100 (not shown), and the treated air may then flow back into the interior of the associated recreational vehicle through cover panel 110 via air outlet 114. Cover panel 110 may also include a removable filter cover 116 mounted to cover panel 110 at an opening 118 defined through cover panel 110. Filter cover 116 may be perforated to allow air flow through filter cover 116, and filter cover 116 may also support or hold a filter medium, such as a concertinaed or pleated fabric filter, fiberglass filter, etc., that filters air entering RVAC 100 at air inlet 112.

Figure 3:
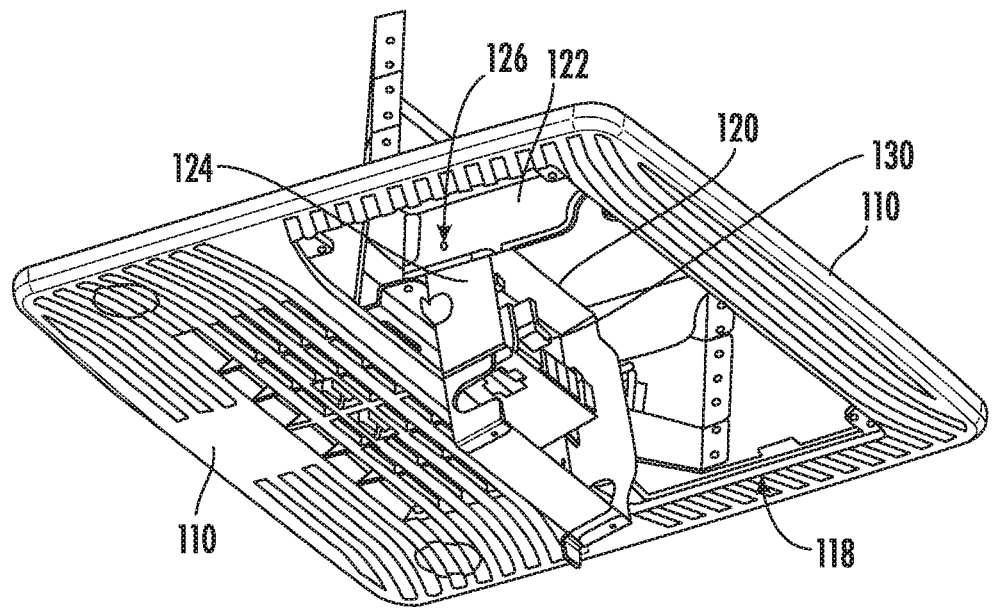
FIG. 3 is a bottom perspective view of a ceiling-mount cover panel and a control box of the example recreational vehicle air conditioner of FIG. 1, in which the control box is shown in an open configuration.

FIG. 3 is a bottom perspective view of cover panel 110 and a control box 120 of RVAC 100. Control box 120 includes a first box portion 122 and a second box portion 124. First box portion 122 of control box 120 is positioned above cover panel 110. For example, first box portion 122 of control box 120 may be mounted to cover panel 110 such that cover panel 110 is fixed relative to cover panel 110. Second box portion 124 of control box 120 is connected to first box portion 122 of control box 120 with a hinge 126, such as a rivet hinge, screw, etc. Thus, e.g., second box portion 124 of control box 120 may be pivotable relative to cover panel 110, as discussed in greater detail below. An electronic control panel 130 is mounted to second box portion 124 of control box 120.

Figure 4:
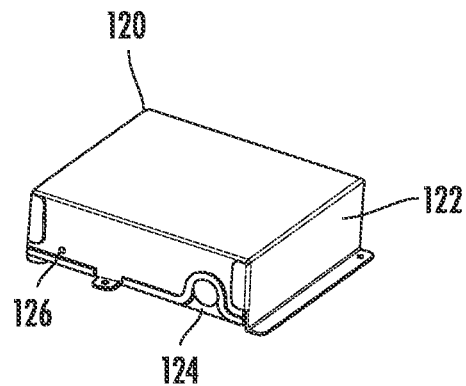
FIG. 4 is a top perspective view of the control box of FIG. 3 in a closed configuration.
Figure 5:
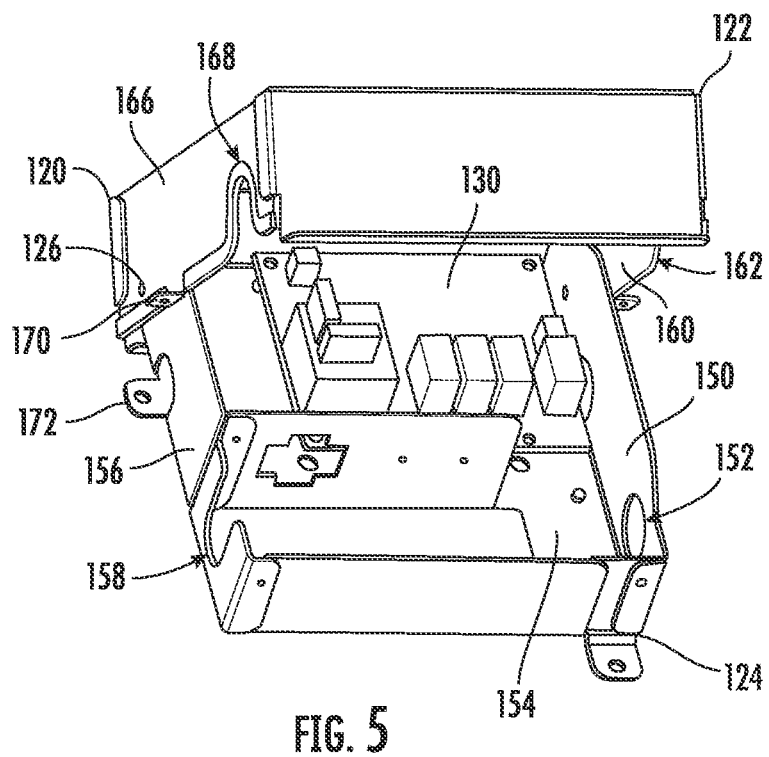
FIG. 5 is a bottom perspective view of the control box of FIG. 3 in the open configuration.

Control box 120 is described in greater detail below with reference to FIGS. 4 through 6. As shown in FIGS. 4 and 5, second box portion 124 is pivotable between a closed configuration (FIG. 4) and an open configuration (FIG. 5) on hinge 126. Second box portion 124 is nested with first box portion 122 in the closed configuration. For example, an outer perimeter of second box portion 124 may be complementary to an inner perimeter of first box portion 122 such that second box portion 124 is received within first box portion 122 in the closed configuration. As shown in FIG. 5, second box portion 124 is pivoted away from first box portion 122 on hinge 126 in the open configuration. For example, second box portion 124 may be angled relative to first box portion 122 on hinge 126 by no less than ninety degrees (90°) and no more than one-hundred and fifty degrees (150°) in the open configuration. As shown in FIGS. 4 and 5, each of first and second box portions 122, 124 of control box 120 may have a rectangular cross-section, e.g., in a plane that is perpendicular to the vertical direction V in the closed configuration.

Electronic control panel 130 may be accessed by shifting second box portion 124 from the closed configuration (FIG. 4) to the open configuration (FIG. 5). In particular, electronic control panel 130 is encased within control box 120 when second box portion 124 is in the closed configuration. For example, electronic control panel 130 may be positioned within an interior of control box 120 defined between first and second box portions 122, 124 when second box portion 124 is in the closed configuration. Thus, a service technician may be unable to access electronic control panel 130 when second box portion 124 is in the closed configuration. Conversely, electronic control panel 130 is exposed when second box portion 124 is in the open configuration. For example, electronic control panel 130 may be pivoted out of the interior of control box 120 when second box portion 124 is in the open configuration. Thus, the service technician may access and view electronic control panel 130 when second box portion 124 is in the open configuration. Due to the hinged connection between first and second box portions 122, 124, second box portion 124 may hang downwardly from first box portion 122, and the service technician may access electronic control panel 130 without needing to support (i.e., hold up) electronic control panel 130. Thus, the service technician may advantageously have two free hands to work on electronic control panel 130 in the open configuration.

As may be seen from the above, hinge 126 may allow second box portion 124 and electronic control panel 130 thereon to advantageously swing open but not completely separate from control box 120. Thus, the first and second box portions 122, 124 may advantageously remain connected by hinge 126 in both the open and closed configurations.

First box portion 122 may be positioned above opening 118 in cover panel 110. Thus, a service technician may reach through opening 118 to access control box 120, e.g., and adjust second box portion 124 between the open and closed configurations. Second box portion 124 may also be positioned above opening 118 in cover panel 110 in the closed position. Conversely, second box portion 124 may extend through opening 118 in cover panel 110 in the open configuration, as shown in FIG. 3. Such movement of second box portion 124 at opening 118 may further facilitate access to electronic control panel 130 on second box portion 124. In particular, the service technician may pivot second box portion 124 to the open configuration such that second box portion 124 extends through opening 118 and such movement of second box portion 124 may also move electronic control panel 130 to a location at which the service technician may easily access electronic control panel 130. For example, electronic control panel 130 may extend through opening 118 with second box portion 124.

Figure 6:
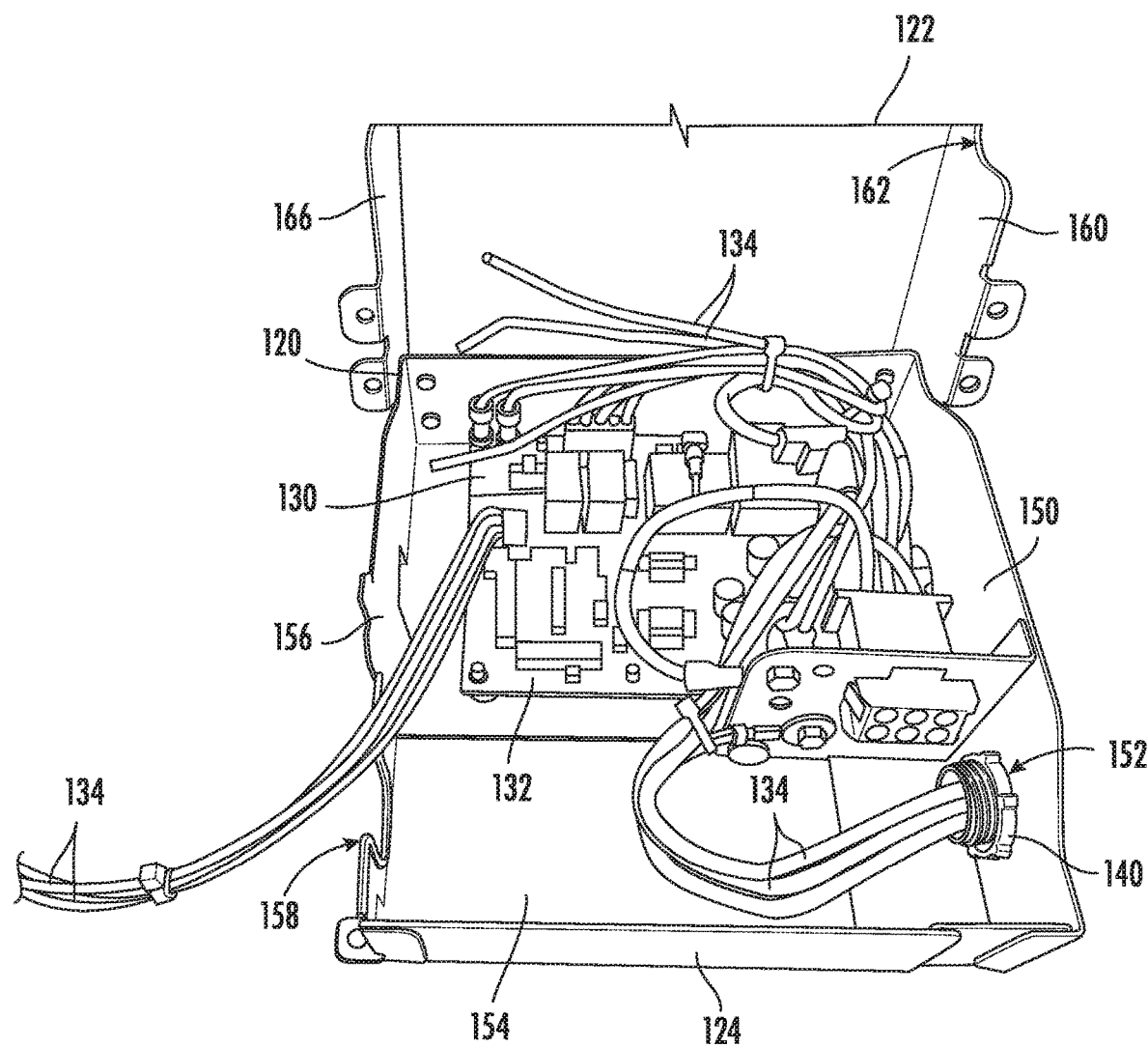
FIG. 6 is a perspective view of an interior of the control box of FIG. 3.

Turning to FIG. 6, electronic control panel 130 may include a printed circuit board (PCB) 132. Electronic control panel 130 may also include a plurality of wires 134 coupled to PCB 132. PCB 132 may regulate operation of various components of RVAC 100, and wires 134 may be connected to various components of RVAC 100. For example, wires 134 may provide electrical power, command signals, etc. Control box 120 protects electronic control panel 130 while also including the above described features for facilitating access to electronic control panel 130, e.g., by a service technician. Control box 120 may be a metal control box for additional safety.

Control box 120 may include a wire clamp 140 mounted to second box portion 124. In particular, wire clamp 140 may be mounted at a hole 152 defined through a first side wall 150 of second box portion 124. Electronic control panel 130 may be mounted to a base plate 154 of second box portion 124. First side wall 150 may extend upwardly along the vertical direction V from base plate 154 in the closed configuration. A first side wall 160 of first box portion 122 defines a slot 162. First side wall 160 of first box portion 122 is positioned adjacent first side wall 150 of second box portion 124 in the closed configuration, and slot 162 is aligned with hole 152 defined through first side wall 150 of second box portion 124 in the closed configuration. Thus, wires, such as power supply lines, may be secured to second box portion 124 with wire clamp 140, and such wires may also extend through hole 152 and slot 162 in the closed configuration. In such a manner, the wires may extend through first and second box portions 122, 124 into the interior of control box 120 and to electronic control panel 130.

With reference to FIGS. 5 and 6, a second side wall 166 of first box portion 122 may also define a slot 168. Second side wall 166 of first box portion 122 may be positioned opposite first side wall 160 of first box portion 122 on first box portion 122. A second side wall 156 of second box portion 124 may also define a slot 158. Second side wall 156 of second box portion 124 may be positioned opposite first side wall 150 of second box portion 124 on second box portion 124. Second side wall 166 of first box portion 122 is positioned adjacent second side wall 156 of second box portion 124 in the closed configuration, and slots 158, 168 are aligned in the closed configuration. Thus, wires, such as a control harness, may extend through slots 158, 168 in the closed configuration. In such a manner, the wires may extend through first and second box portions 122, 124 into the interior of control box 120 and to electronic control panel 130.

Figure 7:
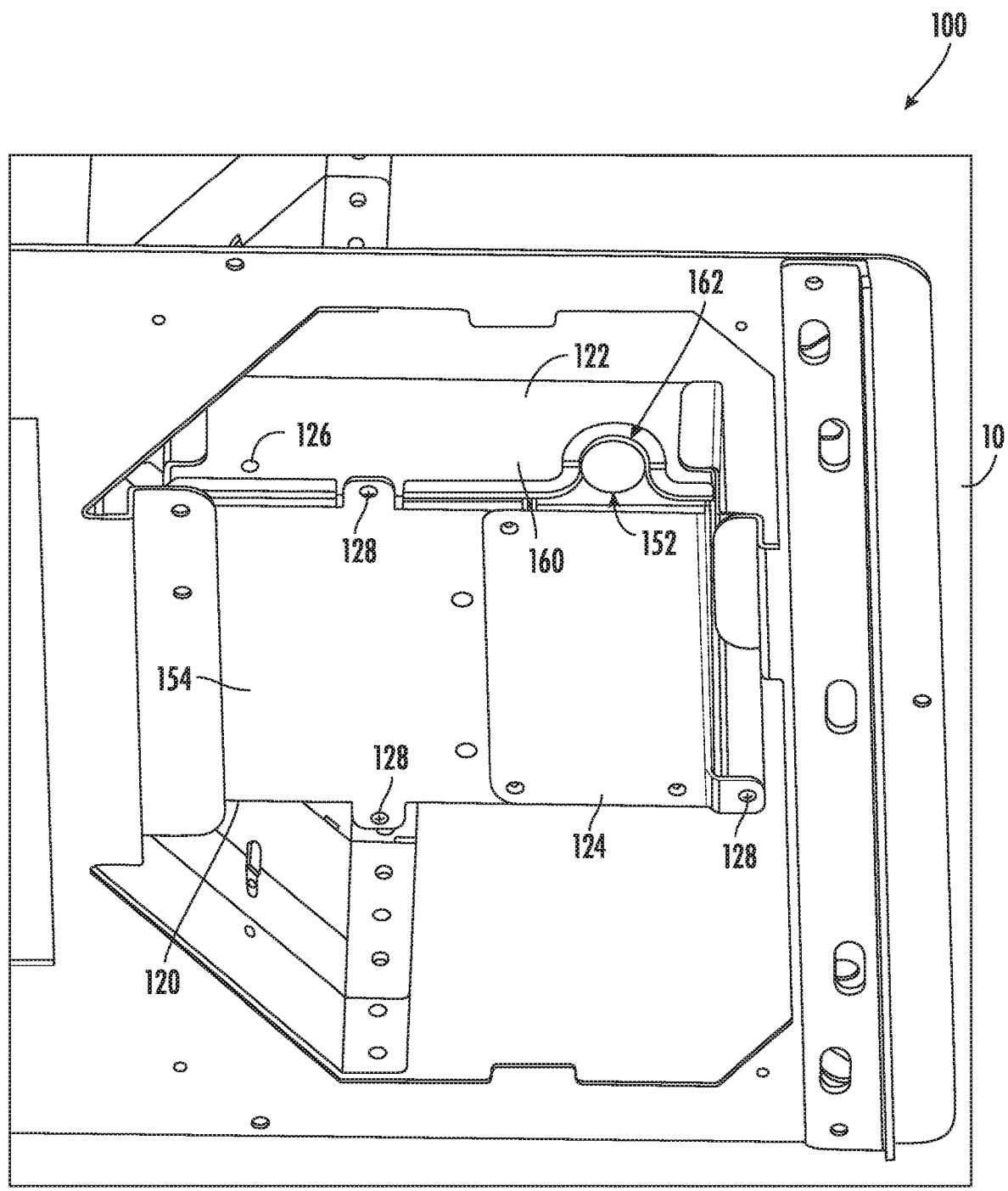
FIG. 7 is a bottom perspective view of the control box of the example recreational vehicle air conditioner of FIG. 2, in which the control box is shown in the closed configuration.

FIG. 7 is a bottom perspective view of control box 120. As shown in FIG. 7, control box 120 may include fasteners 128 for selectively securing second box portion 124 in the closed configuration. For example, as shown in FIG. 5, first and second box portions 122, 124 may each defining a respective tab 170, 162. Tab 170 of first box portion 122 may be positioned at tab 172 of second box portion 124 with one of fasteners 128 extending through tabs 170, 172 in the closed configuration. Thus, fasteners 128 may prevent inadvertent opening of control box 120.

It will be understood that in alternative example embodiments, electronic control panel 130 may be positioned on and mounted to first box portion 122. Thus, electronic control panel 130 may be fixed relative to first box portion 122, and electronic control panel 130 may be accessed by pivoting second box portion 124 to the open configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A recreational vehicle air conditioner, comprising:
   a ceiling-mount cover panel;
   a control box comprising a first box portion and a second box portion, the first box portion positioned above the ceiling-mount cover panel, the second box portion connected to the first box portion with a hinge, the second box portion pivotable between a closed configuration and an open configuration on the hinge, the second box portion nested with the first box portion in the closed configuration, the second box portion pivoted away from the first box portion on the hinge in the open configuration; and
   an electronic control panel mounted to the second box portion of the control box, the electronic control panel disposed above the ceiling-mount cover panel in the closed configuration of the control box, the electronic control panel at least partially disposed below the ceiling-mount cover panel in the open configuration of the control box.

2. The recreational vehicle air conditioner of claim 1, wherein each of the first and second box portions of the control box have a rectangular cross-section in a plane that is perpendicular to a vertical direction in the closed configuration.

3. The recreational vehicle air conditioner of claim 1, wherein the control box is a metal control box.

4. The recreational vehicle air conditioner of claim 1, wherein the control box further comprises a wire clamp mounted to the second box portion at a hole defined through a first side wall of the second box portion.

5. The recreational vehicle air conditioner of claim 4, wherein the electronic control panel is mounted to a base plate of the second box portion of the control box, the first side wall upwardly from the base plate in the closed configuration.

6. The recreational vehicle air conditioner of claim 4, wherein a first side wall of the first box portion defines a slot that is aligned with the hole defined through the first side wall of the second box portion in the closed configuration.

7. The recreational vehicle air conditioner of claim 6, wherein a second side wall of the first box portion defines a slot, the second side wall of the first box portion positioned opposite the first side wall of the first box portion on the first box portion, a second side wall of the second box portion also defining a slot, the second side wall of the second box portion positioned opposite the first side wall of the second box portion on the second box portion, the slot of the second side wall of the first box portion aligned with the slot of the first side wall of the first box portion in the closed configuration.

8. The recreational vehicle air conditioner of claim 1, wherein the hinge is a rivet hinge.

9. The recreational vehicle air conditioner of claim 1, wherein the control box further comprises a fastener for selectively securing the second box portion in the closed configuration, the first and second box portions each defining a respective tab, the tab of the first box portion positioned at the tab of the second box portion with the fastener extending through the tabs of the first and second box portions in the closed configuration.

10. The recreational vehicle air conditioner of claim 1, wherein the electronic control panel comprises a printed circuit board.

11. The recreational vehicle air conditioner of claim 10, wherein the electronic control panel further comprises a plurality of wires coupled to the printed circuit board.

12. The recreational vehicle air conditioner of claim 1, wherein the ceiling-mount cover panel comprises a removable filter cover mountable at an opening in the ceiling-mount cover panel.

13. The recreational vehicle air conditioner of claim 12, wherein the second box portion extends through the opening in the ceiling-mount cover panel in the open configuration.

14. The recreational vehicle air conditioner of claim 13, wherein the first box portion is positioned above the opening in the ceiling-mount cover panel.

15. A recreational vehicle air conditioner, comprising:
    a ceiling-mount cover panel defining an opening;
    a control box comprising a first box portion and a second box portion, the first box portion positioned above the ceiling-mount cover panel, the second box portion connected to the first box portion with a hinge, the second box portion pivotable between a closed configuration and an open configuration on the hinge, the second box portion nested with the first box portion above the opening of the ceiling-mount cover panel in the closed configuration, the second box portion pivoted away from the first box portion on the hinge in the open configuration such that the second box portion extends downwardly through the opening of the ceiling-mount cover panel; and
    an electronic control panel mounted to the first box portion or the second box portion of the control box, the electronic control panel at least partially disposed below the ceiling-mount cover panel in the open configuration of the control box.

16. The recreational vehicle air conditioner of claim 15, wherein:

the control box further comprises a wire clamp mounted to the second box portion at a hole defined through a first side wall of the second box portion;

the electronic control panel is mounted to a base plate of the second box portion of the control box, the first side wall upwardly from the base plate in the closed configuration;

a first side wall of the first box portion defines a slot that is aligned with the hole defined through the first side wall of the second box portion in the closed configuration; and a second side wall of the first box portion defines a slot, the second side wall of the first box portion positioned opposite the first side wall of the first box portion on the first box portion, a second side wall of the second box portion also defining a slot, the second side wall of the second box portion positioned opposite the first side wall of the second box portion on the second box portion, the slot of the second side wall of the first box portion aligned with the slot of the first side wall of the first box portion in the closed configuration.

17. The recreational vehicle air conditioner of claim 15, wherein the control box further comprises a fastener for selectively securing the second box portion in the closed configuration, the first and second box portions each defining a respective tab, the tab of the first box portion positioned at the tab of the second box portion with the fastener extending through the tabs of the first and second box portions in the closed configuration.

18. The recreational vehicle air conditioner of claim 15, wherein the electronic control panel comprises a printed circuit board.

19. The recreational vehicle air conditioner of claim 18, wherein the electronic control panel further comprises a plurality of wires coupled to the printed circuit board.

* * * * *

UNITED STATES PATENT AND TRADEMARK OFFICE
CERTIFICATE OF CORRECTION

| | |
|---|---|
| PATENT NO. | : 11,415,337 B2 |
| APPLICATION NO. | : 16/571354 |
| DATED | : August 16, 2022 |
| INVENTOR(S) | : Richard Dustin Henderson et al. |

It is certified that error appears in the above-identified patent and that said Letters Patent is hereby corrected as shown below:

On the Title Page

Under Assignee (73) reads "Haler US Appliance Solutions, Inc., Wilmington, DE (US)" should read "Haier US Appliance Solutions, Inc., Wilmington, DE (US)"

Signed and Sealed this
Twentieth Day of May, 2025

Coke Morgan Stewart
*Acting Director of the United States Patent and Trademark Office*